United States Patent [19]

Carroll et al.

[11] Patent Number: 4,887,314
[45] Date of Patent: Dec. 12, 1989

[54] OPTICAL FSK DEMODULATOR

[75] Inventors: Edward J. Carroll, Cambridge; Nigel Walker, Ipswich, both of England

[73] Assignee: Plessey Overseas Limited, Ilford, England

[21] Appl. No.: 312,591

[22] Filed: Feb. 16, 1989

Related U.S. Application Data

[63] Continuation of Ser. No. 111,842, Oct. 21, 1987, abandoned.

[30] Foreign Application Priority Data

Oct. 23, 1986 [GB] United Kingdom ................. 8625416

[51] Int. Cl.$^4$ ................................................. H04B 9/00
[52] U.S. Cl. ..................................... 455/619; 455/600; 455/612; 350/96.16; 375/88
[58] Field of Search ................ 455/600, 606, 611, 612, 455/617, 619; 350/96.16, 96.13; 329/144; 375/80, 88, 91

[56] References Cited

U.S. PATENT DOCUMENTS

| | | | |
|---|---|---|---|
| 4,672,636 | 6/1987 | Marshall et al. | 375/88 |
| 4,718,120 | 1/1988 | Tzeng | 455/616 |
| 4,732,447 | 3/1988 | Wright et al. | 455/619 |

OTHER PUBLICATIONS

Saito et al., "S/N and Error Rate Evaluation for an Optical FSK Heterodyne System Using Semiconductor Lasers", IEEE Journal of Quantum Electron, 1983, QE19, pp. 180-193.
Walker et al., "Simultaneous Phase & Amplitude Measurements on Optical Signals Using a Multiport Junction", 8 Nov. 1984, Elect. Lett. 20, No. 23, pp. 981-983.
Hodgkinson et al., "Demodulation of Optical DPSK Using In-Phase & Quadrature Detection", 12 Sep. 1985, Elect. Lett. 21, No. 19 pp. 867-868.
Davis et al., "Coherent Optical Receiver for 680 Mbit/s Using Phase Diversity", 2 Jan. 1986, Elect. Lett. 22, No. 1, pp. 9-11.
Kazovsky et al.; "ASK Multiport Optical Homodyne Receivers"; Bell Communications Research; Navesink Research and Engineering Center.

Primary Examiner—Robert L. Griffin
Assistant Examiner—Andrew J. Telesz, Jr.
Attorney, Agent, or Firm—Fleit, Jacobson, Cohn, Price, Holman & Stern

[57] ABSTRACT

An optical demodulator in which a local oscillator reference signal and a frequency shift keyed modulated input signal are optically combined by means of an optical multiport junction. These signals are detected to produce phase-diverse electrical signals at beat frequency and electrically processed to provide a demodulated signal. The electrical processing circuitry is phase discriminating and thus produces a signal in which the amplitude is dependent upon the lead/lag phase relationship of the detected signals. The local oscillator is tuned to, and maintained at, a frequency that is midway between the FSK signal tones so that the lead or lag of phase is directly related to the frequency shift coding. The phase discriminant signal processing may be performed using envelope detection.

5 Claims, 3 Drawing Sheets

OPTICAL FSK DEMODULATOR

This is a continuation of application Ser. No. 111,842, filed Oct. 21, 1987, and now abandoned.

BACKGROUND OF THE INVENTION

1. Field of the Invention

The present invention concerns improvements in or relating to the demodulation of frequency shift keyed (FSK) optical transmissions.

Coherent optical communication systems offer higher practical receiver sensitivity and higher wavelength selectivity than direct detection systems. These advantages are gained at the expense of severe stability requirements on the local oscillator and signal lasers. Estimates suggest that the combined local oscillator and transmitter laser linewidth must be less than 0.5% of the bit rate for PSK systems, although this can be relaxed to 10-30% for asynchronous ASK and FSK heterodyne systems. Frequency shift keying (FSK) is attractive from this standpoint and also because it allows direct modulation of the transmitter injection laser via the drive current. Hitherto major drawback of FSK systems has been the need for receivers having four times the bandwidth of the baseband data.

2. Description of Related Art

In direct FSK demodulation, optical frequency modulated signals are demodulated using an optical frequency discriminator. Though direct detection is a basic and simple configuration for optical FSK systems, it does not bring about any improvements in the received signal power level.

In a conventional FSK heterodyne system (FIG. 1) optical signals from the FSK transmitter are demodulated in two steps of optical and electrical demodulation. The transmitted beam is coupled with a beam from a local oscillator 3 and is converted into an IF signal by means of a square-law detector 5. This produces an electrical IF signal which then is amplified and filtered at 7. It is then demodulated to the baseband signal by an RF frequency discriminator 9 and the IF signal passed via a baseband filter 11. IF signal frequency stability is a requisite for stable FSK signal demodulation. It is usual therefore to include a feedback loop amplifier 13, following the discriminator 9, to control the frequency of the local oscillator laser 3. A bandwidth for the receiver amplifier, of four times that of the baseband data is usual for this system.

An alternative approach to this is to use a single filter envelope detector having a cut-off midway between the upper and lower signal tones. See Saito et al, "S/N and error rate evaluation for an optical FSK heterodyne system using semiconductor lasers", IEEE Journal of Quantum Electron. 1983 QE-19 pp 180-193. This then has the advantage of a reduced bandwidth, but this is at the expense of a 3 dB loss in signal sensitivity.

SUMMARY OF THE INVENTION

The present invention is intended to provide an alternative—an FSK demodulator offering reduced bandwidth but without a corresponding loss in sensitivity.

In accordance with the invention thus there is provided a frequency shift-keyed (FSK) signal demodulator comprising:

a local oscillator, for providing a coherent optical reference signal of frequency midway between signal tones;

an optical multiport junction, coupled to the local oscillator and responsive to input signal, for providing combinations of the reference signal and the input signal at the output ports thereof;

detecting means, co-operative with the output ports of the multiport junctions, to produce a plurality of phase-diverse electrical signals at beat frequency in response to the combined optical signals directed thereto; and, phase discriminating means, co-operative with the detecting means, to produce a demodulated signal the amplitude of which is determined in dependence upon the lead/lag phase relationship of said electrical signals.

The phase discriminating means aforementioned may be either synchronous or asynchronous. The latter does not require frequency-lock circuitry, is therefore less expensive to implement, can be of simple design and is thus preferred. In this latter case, discrimination may be performed using envelope detection.

In multiport detection as aforesaid the signal and local oscillator are combined in the multiport junction to produce, in general, more than two outputs. Provided that they are combined with suitable phase diversity, then it is possible to determine their relative phase and amplitude. In the limit of a strong local oscillator, photocurrents developed at the output ports become, apart from a large constant term due to the local oscillator power, proportional to the components of signal complex amplitude in directions determined by the phase diversity introduced by the multiport. For a 3×3 multiport implementation with symmetrical coupling, the three photocurrents provide three signals, A, B and C given by $$A = a_s \cos(\Theta);$$

$$B = a_s \cos(\Theta + 2\lambda/3); \text{ and,}$$

$$C = a_s \cos(\Theta - 2\lambda/3);$$

where $a_s$ is the signal amplitude and $\Theta$ is the phase of the signal relative to a zero set by the local oscillator and choice of optical reference planes. For a balanced 4×4 multiport implementation the detectors provide four photocurrents of which complementary pairs can be combined to give the in-phase component of the signal relative to the local oscillator and the quadrature component. Writing these as I and Q gives $$I = a_s \cos(\Theta); \text{ and,}$$

$$Q = a_s \sin(\Theta).$$

Measurement of A, B and C or I and Q gives complete knowledge of the complex amplitude of the signal relative to the local oscillator, namely $a_s$ and $\Theta$. Where here the local oscillator and signal are independant, $\Theta$ will change at the beat frequency between them. In this heterodyne detection scheme $\Theta$ thus rotates at this intermediate frequency (IF). With FSK, an advantage of multiport detection is that it is possible to distinguish between positive and negative intermediate frequencies by observing the direction of this rotation of $\Theta$. The optical local oscillator frequency is set midway between the two signal tones so that this direction of rotation provides a discriminant for the transmitted data. For minimum spacing of the two signal tones the required bandwidth of each detector individually is twice the base bandwidth, rather than four times the base bandwidth required in conventional FSK detection. This reduction of bandwidth is important for high bit rate systems since large bandwidth is difficult to achieve with low noise pre-amplifiers. This multiport approach also has the advantage that it does not suffer the 3 dB sensitivity penalty inherent to the reduced bandwidth single filter detection system mentioned earlier.

BRIEF DESCRIPTION OF THE DRAWINGS

In the drawings accompanying this specification.

DESCRIPTION OF THE PREFERRED EMBODIMENTS

So that this invention may be better understood, embodiments thereof will now be described and reference will be made to FIGS. 2 to 4 of the accompanying drawings. The description that follows is given by way of example only.

Figure 1:
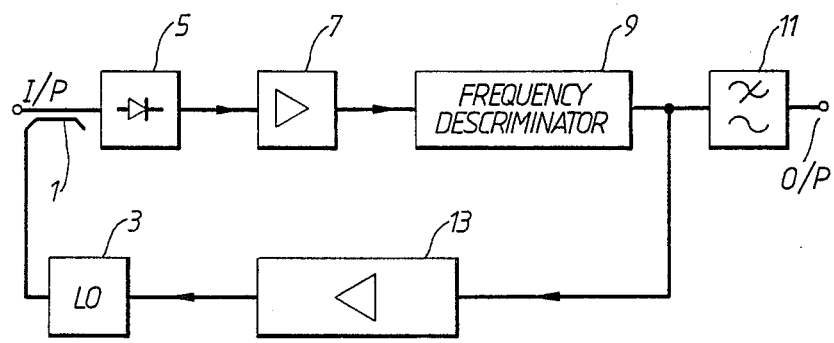
FIG. 1 is a block diagram showing the arrangement of a conventional form of an FSK heterodyne demodulation system.
Figure 2:
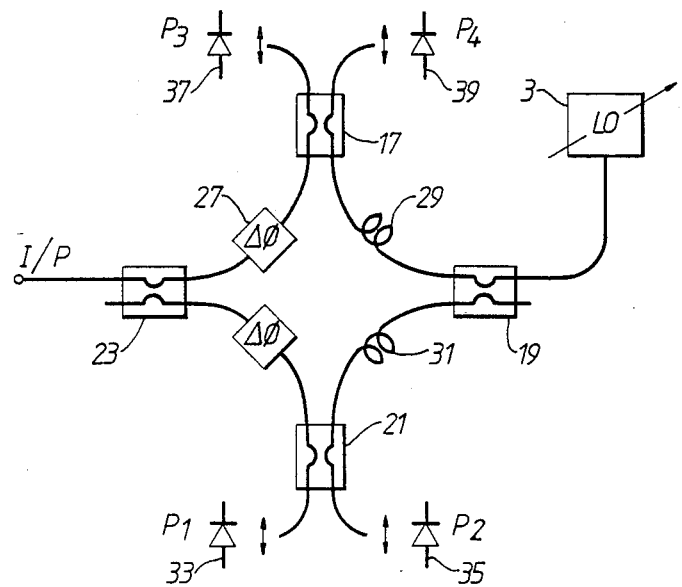
FIG. 2 is a block diagram showing the arrangement of a 4×4 multiport junction of fibre construction.
Figure 3:
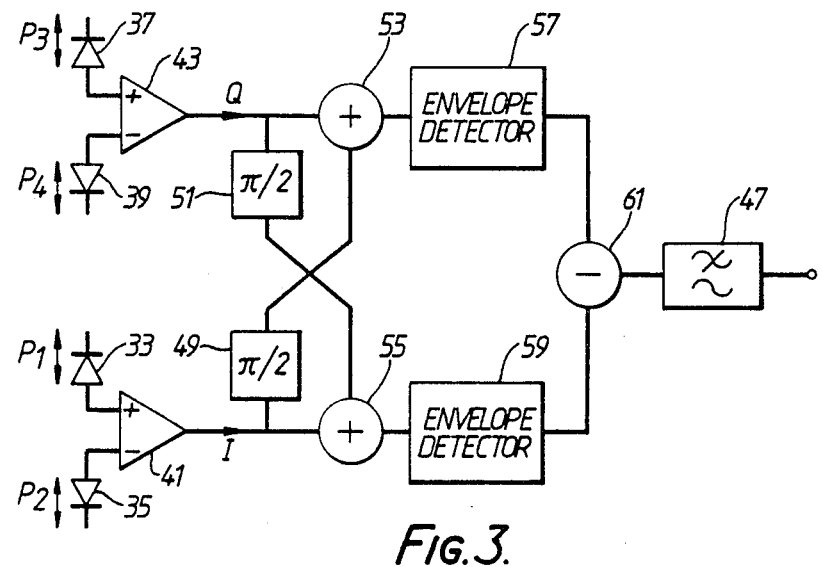
FIG. 3 is a block diagram of an electrical processing circuit, using envelope detection, for use in combination with the multiport junction of FIG. 2 and in accord with this invention; and, FIG. 4 is a block diagram of an alternative electrical processing circuit, also using envelope detection for use in combination with a 3×3 multiport junction, also in accord with this invention.

A 4×4 multiport junction implementation is shown in FIGS. 2 and 3. It is convenient to use a 4×4 balanced multiport junction 15 of optical fibre construction e.g. as shown in FIG. 2. This junction 15 comprises a network of four 2×2 fibre couplers 17, 19, 21 and 23. In two arms of this network, variable phase delay units 25 and 27 have been inserted to allow adjustment of phase to provide the requisite balance. In the other two arms a pair of polarisation controllers 29 and 31 have also been inserted. A local oscillator, laser 3, is connected to one input port of the multiport junction 15, to act as a source of reference signal. Input optical signal I/P, from an FSK transmitter, is coupled to another appropriate input port. The remaining two input ports are not used. Different phase combinations of the input and reference optical signals are directed to photodiodes 33, 35, 37 and 39 which are adjacent to the output of the junction 15.

The electrical processing part of this implementation is shown in FIG. 3. In this, the simplest arrangement, complimentary pairs of the signals $P_1$ and $P_2$, $P_3$ and $P_4$ are subtracted by means of difference amplifiers 41 and 43 to produce in-phase and quadrature signals I and Q. The quadrature signal Q will either lead or lag in phase the in-phase signal I. This will depend upon the frequency shift, either the upper or lower frequency tone state, of the FSK modulated optical signal.

Phase discrimination is provided by envelope detection in the manner illustrated. Each of the signals, the in-phase signal I and the quadrature signal Q is passed via a $\pi/2$ phase delay (intermediate frequency) component 49, 51 to a corresponding summing node 53, 55 where it is added to the other of these two signals Q, I. The sum signal of each node 53, 55 is then passed via a respective envelope detector e.g. a rectifier 57, 59 to a subtractive node 61. The demodulated signal, produced at this node 61, is then passed via a baseband filter 47 to output O/P.

By comparison with the 3×3 junction implementation to be discussed below, it will be seen that the above electrical processing circuitry is more straightforward and requires thus fewer components for implementation. However, the optical part—the 4×4 multiport junction is less straightforward as it requires careful adjustment etc. to ensure the requisite balance conditions. The 3×3 multiport junction is easier to produce and is readily available as a conventional commercial product. Details of electrical asynchronous discriminating circuits suitable for use with this junction will also be discussed.

In the 3×3 multiport implementation discussed below, the three photocurrents A, B and C have the form of a three-phase a.c. signal at the intermediate frequency (IF). The phase sequence ABC or ACB will depend upon the frequency state, the upper or lower tone of the FSK modulated optical signal that is applied.

Figure 4:
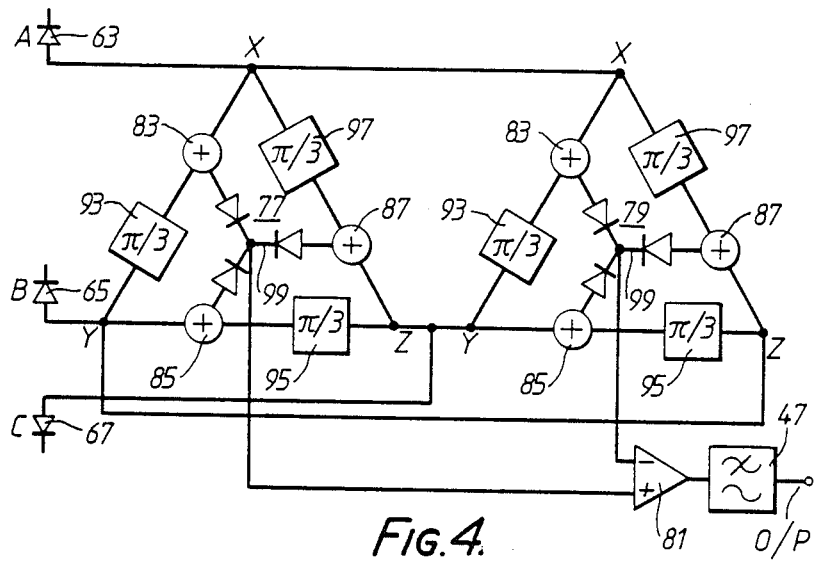

In the arrangement shown in FIG. 4, the optical signals at the outputs of a 3×3 optical multiport junction (not shown) are detected by means of photodiodes or other square law photodetectors 63, 65 and 67, and the generated photocurrents A, B and C referred to a phase discriminating network.

In the arrangement shown in FIG. 4, an envelope detection arrangement, the photocurrents A, B and C are referred to a pair of phase discriminating networks 77 and 79. The signals produced at the output of each of these neworks 77 and 79 are then subtracted by means of a difference amplifier 81 and the demodulated signal produced is baseband filtered 47. Each like network 77 and 79 comprises three symmetrically disposed summing nodes 83, 85 and 87 each with a corresponding delay component 93, 95 and 97 connected to one of their two inputs. Each delay component provides a phase delay of $\pi/3$ at the intermediate frequency. The summing nodes 83, 85 and 87 are connected directly to input junctions X, Y, Z respectively, whilst nodes 87, 83 and 85 are also connected to these junctions via the delay components 97, 93 and 95. Each summing node 83, 85 and 87 is connected to a rectifying diode network 99 to produce input signals for the difference amplifier 81. It will be noted that the phase connections to these two circuits 77 and 79 are reversed. Thus for one circuit 77, the photocurrents B and C are referred to input junctions Y and Z whilst for the other circuit 79, these photocurrents B and C are reversed and thus referred to input junctions Z and Y. One circuit will produce maximum output when the phase sequence is in the order ABC, whilst the other circuit will produce maximum output when the phase sequence is reversed, i.e. ACB.

In the foregoing arrangements, the local oscillator frequency (f) is maintained at a frequency ($f_o$) that is precisely midway between the two FSK tones ($f_o + \delta f$). To this end the optical transmission signal can be coded to provide bursts of frequency lock information to preceed each batch of data. This information can have the form of a train of evenly spaced high-tone and low-tone pulses. Frequency lock can then be attained by maximising the power through the pass band filter when the train of evenly spaced ($f_o + \delta f$) and ($f_o - \delta f$) pulses is passed with $\delta f$ well out on the wings of the pass-band. Thus if $f = f_o$ then the output is:

$$2/1 + (f)^2/f_o^2$$

But when out-of-lock (ie. F≠f$_o$), the changes in error signal output would be proportional to:

$$\{1/[1 + (f_o + \delta f - f)^2]\} + \{1/1 + f_o - (\delta f - f)^2/f_o^2]\} - \{2/[1 + (\delta f)^2/f_o^2]\}$$

ie. $\alpha - 2(f - f_o)^2$.

So that the output is indeed a maximum when $f = f_o$. Other control circuits, to lock the local oscillator on track are not preceeded from the general scope of this invention.

What we claim is:

1. A frequency shift keyed (FSK) optical signal demodulator for demodulating a two-tone FSK modulated optical input signal, the same comprising:
    a local oscillator, tuned for providing a coherent optical reference signal of frequency that is midway between the two signal tones of said input signal; an optical multiport junction, coupled to the local oscillator at one input port and responsive to said input signal applied to another input port thereof, for providing phased combinations of the reference signal and the input signal at output ports thereof; detecting means, co-operative with the output ports of the multiport junction, to produce a plurality of phase-diverse electical signals at a common beat frequency in response to the combined optical signals directed thereto; and,
    phase discriminating means, co-operative with the detecting means, to produce a demodulated signal the amplitude of which is determined in dependance upon the lead/lag phase relationship of said electrical signals.

2. An FSK demodulator, as claimed in claim 1, comprising:
    4×4 multiport junction;
    first and second difference amplifiers;
    a corresponding set of four photodetectors connected in pairs to first and second difference amplifiers respectively, to produce in-phase and quadrature electrical signals at respective outputs of said amplifiers; and,
    phase discriminating means, connected to said amplifier outputs, to produce the demodulated signal in dependance upon the lead/lag phase relationship of said in-phase and quadrature electrical signals.

3. An FSK demodulator, as claimed in claim 2, wherein the phase discriminating means comprises a delay-and-add network to produce quadrature phase shifted combinations of the in-phase and quadrature electrical signals, an envelope detector responsive to each network output, and a subtractive node connected to an output of each envelope detector respectively.

4. An FSK demodulator, as claimed in claim 1, comprising a 3×3 multiport junction;
    a corresponding set of three photodetectors, one at each output port of the multiport junction; and,
    phase discriminating means to produce the demodulated signal in dependance upon the phase sequence of signal currents produced by each of the photodetectors.

5. An FSK demodulator, as claimed in claim 4, wherein the phase discriminating means comprises a pair of like delay-add-and-rectify networks; and, a difference amplifier connected to both networks.

* * * * *